United States Patent
Lepschy et al.

(10) Patent No.: US 7,113,791 B2
(45) Date of Patent: Sep. 26, 2006

(54) METHOD FOR ASSESSING THE CHARACTERISTICS OF A NETWORK FOR MOBILE TELECOMMUNICATIONS APPARATUSES

(75) Inventors: Chiara Lepschy, Turin (IT); Giuseppe Minerva, Turin (IT); Daniela Minervini, Turin (IT); Francesca Pascali, Turin (IT)

(73) Assignee: Telecom Italia S.P.A., Milan (IT)

( * ) Notice: Subject to any disclaimer, the term of this patent is extended or adjusted under 35 U.S.C. 154(b) by 77 days.

(21) Appl. No.: 10/473,614

(22) PCT Filed: Mar. 26, 2002

(86) PCT No.: PCT/IT02/00193

§ 371 (c)(1),
(2), (4) Date: Oct. 28, 2003

(87) PCT Pub. No.: WO02/080602

PCT Pub. Date: Oct. 10, 2002

(65) Prior Publication Data

US 2004/0116124 A1    Jun. 17, 2004

(30) Foreign Application Priority Data

Mar. 30, 2001   (IT) ........................... TO2001A0297

(51) Int. Cl.
*H04Q 7/20* (2006.01)

(52) U.S. Cl. .................. 455/452.2; 455/423; 455/450; 455/451; 370/230; 370/230.1; 370/232; 370/252

(58) Field of Classification Search ................ 455/403, 455/423–425, 450, 451, 452.1, 452.2; 379/265.08, 379/265.14, 266.01, 266.04; 370/230.01, 370/232, 252–253; 709/224
See application file for complete search history.

(56) References Cited

U.S. PATENT DOCUMENTS

| | | | | |
|---|---|---|---|---|
| 5,434,848 A | * | 7/1995 | Chimento et al. .......... 370/232 |
| 5,583,792 A | * | 12/1996 | Li et al. ...................... 709/224 |
| 5,878,026 A | * | 3/1999 | Greenberg et al. .......... 370/230 |
| 5,923,873 A | * | 7/1999 | Massey et al. .............. 718/100 |
| 6,304,551 B1 | * | 10/2001 | Ramamurthy et al. ...... 370/232 |
| 6,442,169 B1 | * | 8/2002 | Lewis ......................... 370/401 |
| 6,615,040 B1 | * | 9/2003 | Benveniste ................. 455/423 |
| 6,621,901 B1 | * | 9/2003 | Gruia et al. ........... 379/266.07 |
| 6,665,271 B1 | * | 12/2003 | Thomas et al. ............. 370/252 |
| 6,826,151 B1 | * | 11/2004 | Li et al. .................. 370/230.1 |

OTHER PUBLICATIONS

Sante et al., (1997 IEEE), Analysis of Impact of Multiple Services on Dynamic Carrier Allocations for 3rd Generation TDMA Systems.*

Analysis of Impact of Multiple Services on Dynamic Carrier . . . by Santé et al (1997 IEEE).

The 3G GPRS Mobile Systems Problem . . . Bby Markhasin et al. (2001 IEEE).

Traffic Engineering and Realistic Network Capacity in Cellular Radio . . . by Baier et al. (1997 IEEE).

* cited by examiner

*Primary Examiner*—Stephen D'Agosta
(74) *Attorney, Agent, or Firm*—Herbert Dubno

(57) ABSTRACT

A method of assessing traffic and performance characteristics of a mobile telecommunications network in terms of the level of service has inputs as to performance requirements for voice traffic and voice loss, data traffic or data loss, information with respect to the voice traffic offered and the data traffic offered and average length of an individual message. The determination is made on the basis of the number of radio slots which are allocable to data traffic and on the basis of an exponential distribution of the average call waiting time in the queue.

5 Claims, 2 Drawing Sheets

METHOD FOR ASSESSING THE CHARACTERISTICS OF A NETWORK FOR MOBILE TELECOMMUNICATIONS APPARATUSES

CROSS REFERENCE TO RELATED APPLICATIONS

This application is a national stage of PCT/IT02/00193 filed 2 Mar. 2002 and based upon Italian National application TO 2001A000297 of 30 Mar. 2001 under the International Convention.

TECHNICAL FIELD

This invention relates to a method of assessing the characteristics of a network for a mobile telecommunications apparatus on the basis of parameters such as the number of radio resources (base stations) available and the amount of telephone traffic offered to it.

In particular, this invention relates to a method for assessing the characteristics in terms of dimensioning and performance of base stations of a GSM-GPRS type network (Global System for Mobile communications—General Packet Radio Service on mobile networks) which, as is known, uses a hybrid radio interface based on Frequency Division Multiple Access (FDMA) and Time Division Multiple Access (TDMA), and which makes it possible to manage both voice calls and data calls.

The method therefore concerns the assessment of the correct dimensioning and performance of radio resources on the basis of the number and duration of the voice telephone calls (voice traffic) and the number of and volume of information to transmit in data calls (data traffic) and of the priority attributed to voice traffic calls compared with data traffic ones.

BACKGROUND ART

Networks for mobile telecommunications apparatuses are known. These networks are generally described as cellular and they are distinguished by a plurality of cells, each defined as the group of territorial points served by the radio-electric signal radiated by an antenna (radio interface).

Apart from the intrinsic mobility of users, the main peculiarity of networks of mobile apparatuses is the use of the radio interface as access port to the network itself.

It is also known that dimension and performance assessments of telecommunications networks or systems in which the traffic offered is composed of voice traffic only, are made by using a method at the basis of which is a model described as being of the M/M/N type where the first M stands for the exponential distribution of the calls offered by the system, the second M stands for the exponential distribution of the duration of the calls served and N corresponds to the number of lines, telephone channels or resources available, all this being expressed using what is known as the "Erlang-B" formula.

Using this method it is possible to determine dimensioning and/or performance in probabilistic terms or, in other words, the level of service P(c) of the telecommunications system examined, in the periods with the highest traffic (peak time), by means of the formula:

$$P(c) = \frac{\frac{\rho^c}{c!}}{\sum_{i=0}^{c} \frac{\rho^i}{i!}}$$

and in which:

λ is the number of calls arriving per unit of time:
μ is the number of calls served per unit of time:
C is the number of lines, telephone channels or resources available.

According to the state of the art, therefore, P(c) represents the percentage of incoming calls (or offers) not served (that is, blocked by the system) during the period of highest traffic (peak time) and is calculated on the basis of the telephone traffic offered and of the lines, telephone channels or resources available, naturally in the commonly known and accepted hypotheses that:

the number of incoming voice calls has a Poisson distribution with parameter λ, meaning, in an intuitive manner, that the distribution of the time between the instant of arrival of a call and the instant of arrival of the next call (inter-arrival time) is of the exponential type with parameter λ and, as a consequence, there are no bursts of calls;

the number of voice calls served has a distribution of the exponential type with parameter μ, meaning, in intuitive manner, that the distribution of the duration of the calls served by the system is of the exponential type with parameter μ.

The known method is indisputably adequate for assessing the dimensioning and performance of a telecommunications system of the type described and, as a consequence, of a base station (cell) of a mobile telephony system, such as GSM, which manages voice traffic only, as, in this case, the hypotheses indicated effectively provide a good approximation of reality.

It is also known that the assessment of the dimensioning and performance of telecommunications systems with voice traffic characterized by the presence of "queues", because there are telephone exchanges for example, is carried out using methods at the basis of which is a model of the M/M/N/Q type in which the first three terms have the meanings already illustrated above and Q represents the number of calls awaiting service which can be queued in the system.

In general, these methods are characterised by the fact that they envisage a user "impatience" factor with a dropped call frequency parameter α.

However, the known methods mentioned so far are not suitable for managing data traffic, and even less, for mixed voice and data traffic and, as a consequence, cannot be used for assessing the dimensioning and performance of network base stations, of the GSM-GPRS type, for example.

As is known, in fact, a peculiarity of data or voice and data networks, such as GSM-GPRS networks, consists of the fact that networks of this type are suitable for supplying a multiplicity of "services" such as, for example, voice telephony, FTP, email and Internet access and that each of these service has, as a rule, different characteristics both in terms of speed (number of bits per second) and of traffic (volume to transmit, symmetry or asymmetry of the service). It follows from this that system cell dimensioning must take account jointly of the characteristics of each service and, in particular, of the coexistence of the traditional voice service and of the data services supported.

A first technical problem linked with the need to support data traffic consists of the fact that the data traffic transmission speed in these types of network and, more in general, in fixed data telephony networks, is not constant with time and greatly depends of the number of lines, telephone channels or resources available in a given instant.

In the specific case of the GSM-GPRS network, as is known, data traffic for the various types of service is managed (served) using radio carriers of predefined frequency and, in the framework of each radio carrier (FDMA access technique), by a given slot (the logic channel) among those periodically available in the framework of the time frame used on the radio interface (TDMA access technique). In this context, if even one user requests a data transmission, one whole slot of the GSM time frame is assigned to the user itself and this implies a given transmission speed, for example 9.05 kbit/s nominal, for the data encoding denominated CS-1, or 13.4 kbit/s nominal for the date encoding denominated CS-2. If, on the other hand, several users simultaneously request data transmission, the single slot is subdivided among the users themselves, with a consequent drop in the transmission speed which will therefore be a function of the number of active users in the system (cell) at that moment; in a more intuitive manner, the generic user notes a net data transmission speed which varies with time on the basis of the load conditions in the system itself. The characteristics of the phenomenon described are clearly different from those typical of simple voice-only transmission for which, as is known, the GSM time frame slot assigned to the user is attributed to the same in a univocal and exclusive manner until completion of the telephone call.

Therefore, the use of a method which has the Erlang-B formula as a basis, as found in the known state of the art, is found to be a very rough approximation of the results and in fact translates into a very approximate assessment of the dimensioning of a data management network, such as, for example, a GSM-GPRS network. A second problem found in the known state of the art consists of the fact that nevertheless, as a rule, data traffic does not need to be served immediately and can therefore be queued and apparently therefore be approximated to an M/M/N/Q model in which this traffic leaves the queue or is served (if a phone channel is freed in the meantime) or because of dropping out of the system (what is called the customer's "impatience" which models the terminal-cell combination here), such a M/M/N/Q model and corresponding method once again entails a rough approximation of the results as its does not envisage managing the traffic with resources which vary over time.

Therefore, the use of a method which has the Erlang-B formula as a basis, modified to take account of the fact that the data traffic can be queued, as found in the known state of the art, is found to be a very rough approximation of the results and in fact translates into a very approximate assessment of the dimensioning of a data and/or voice management network, such as, for example, the GSM-GPRS network.

A third problem present, in particular, in the case of co-existence of voice traffic and data traffic, resides in the fact that, as is known, to the extent that priority in these cases is given to voice traffic with respect to data traffic (preemption) in such a way as to attribute all the resources (or, in any case, all the resources placed in common between the two type of services) to the first type of traffic rather than to the second to which, at most, a minimum capacity protected from intrusion by voice calls is reserved, in this case to the state of the art known to date does not take account of this preemption, and, therefore, in assessing the performance of a mixed voice and data network, it substantially assesses performance as if voice and data did not coexist and there was no preemption.

It clearly emerges from the problems described so far, that the known methodologies for assessing dimensioning and performance of the base stations of a network for mobile telecommunications apparatuses are inadequate for the requirements and are such as to lead to rough assessment errors, as they do not take account of the peculiarities of data and/or voice and data traffic.

OBJECT OF THE INVENTION

It is the object of this invention to provide a method for assessing the dimensioning and performance of base stations in a network for mobile telecommunications apparatuses which does not have the limits described in the known state of the art and which, as a consequence, takes account of the specific problems of the transmission of data and/or of the coexistence of voice traffic and data traffic and which is, in particular, adequate for solving the problems of GSM-GPRS networks and which is, at the same time, simple and easy to apply.

This object is achieved by the method as described in the claims.

SUMMARY OF THE INVENTION

This object is achieved in a method for assessing the characteristics of a network for mobile telecommunications apparatuses suitable for managing telephone calls relating data traffic and/or voice and data traffic between the mobile apparatuses and a base station and in which the calls relating to the data traffic are such that they can be queued for a determined time. The method comprises attributing an average call frequency for data traffic with an exponential distribution with parameter $\lambda$ attributing an average call duration for data traffic with an exponential distribution with parameter $\mu$ attributing an average call waiting time in the queue for data traffic with an exponential distribution with parameter $\alpha$ and determining the characteristics of the network with regard to the data traffic in terms of level of service in the period of peak traffic, on the basis of a determined number of radio slots allocable to data traffic, and on the basis of said exponential distribution, having as parameters $\lambda$, $\mu$ and $\alpha$. The parameter $\mu$ should, according to the invention, be suitable for contributing in an additive manner for determining, associated with said parameter $\lambda$, the level of service in the period of peak traffic in terms of probability of a total occupation of said radio slots allocable. The parameter $\alpha$ should be suitable for contributing in an additive manner for determining the level of service in the period of peak traffic in terms of probability of calls dropped from the queue with regard to data traffic.

The step of determining the characteristics of the network can also comprise the steps of comparing the characteristics so determined with predetermined performance values; and updating the determined number of radio slots allocable in such a way that the characteristics so determined correspond to the predetermined performance values.

The step for determining the characteristics of the network can comprise a step for determining the network characteristics with regard to the data traffic between the mobile apparatuses and the base station; and a step for determining the network characteristics with regard to the data traffic between the base station and the mobile apparatuses.

The number of radio channels allocable to data traffic can be determined by the steps of:

determining the number of radio slots necessary for managing voice traffic;

determining the probability that the radio slots for managing voice traffic occupy the slots allocable to data traffic.

BRIEF DESCRIPTION OF DRAWING

These and the other features of this invention will be clear from the following description of a preferred form of embodiment, provided for exemplificative and not limitative purposes, with the aid of the accompanying drawing, in which.

BEST MODE FOR CARRYING OUT THE INVENTION

Figure 1:
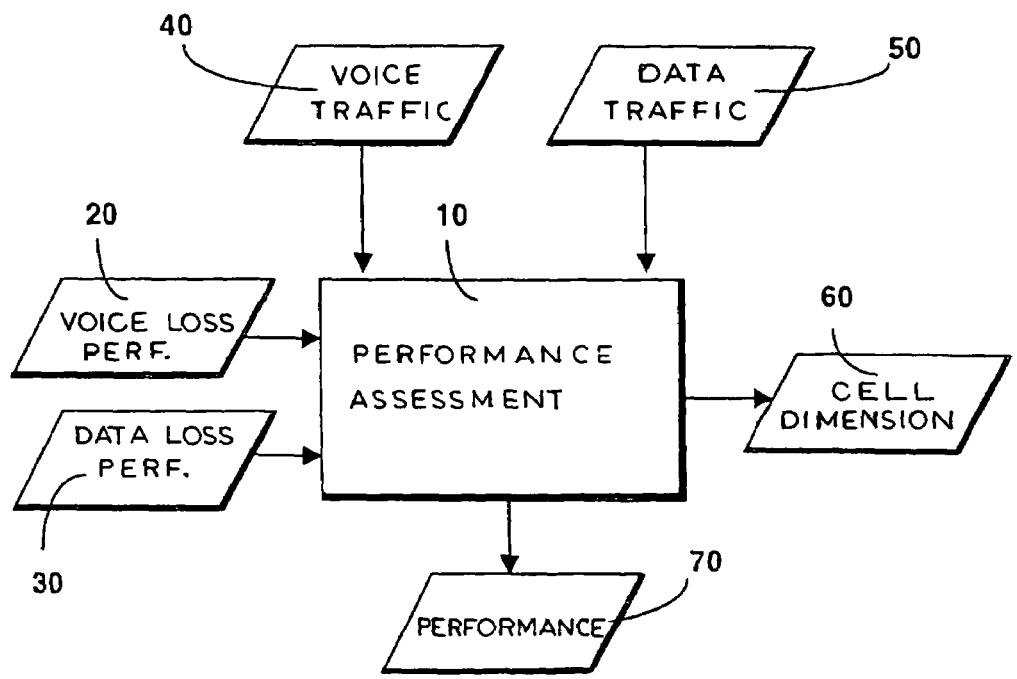
FIG. 1 is a block diagram of the inputs needed for applying the method for assessing the characteristics of a base station for mobile telecommunications apparatuses, according to the invention, and the outputs guaranteed by the method itself.

With reference to FIG. 1, a method 10 for assessing the characteristics in terms of dimensioning and performance of a mobile telecommunications network, for example a GSM-GPRS mobile telecommunications network, envisages a set of inputs composed, in detail, of performance required for the voice traffic (voice loss) 20, of performance required for the data traffic (data loss or user throughput) 30, of descriptions of the voice traffic offered (Erlang) 40 and of descriptions of the data traffic offered (GPRS traffic) 50 composed of the arrival frequency of the data calls and average length of the individual message.

The method 10, according to the invention, is suitable for supplying both an optima dimensioning 60 of the GSM-GRPS cell (number of radio carriers) given the required performance 20 and 30, and the performance offered, and the effective performance 70 of the cell itself given the inputs 20, 30, 40 and 50.

In particular, from the operative point of view, the method 10 for assessing the dimensioning and performance of a base station in a mobile telecommunications network suitable for managing voice and data, a GSM-GPRS network for example, comprises a set of stages which can be grouped in six fundamental logical blocks.

Figure 2:
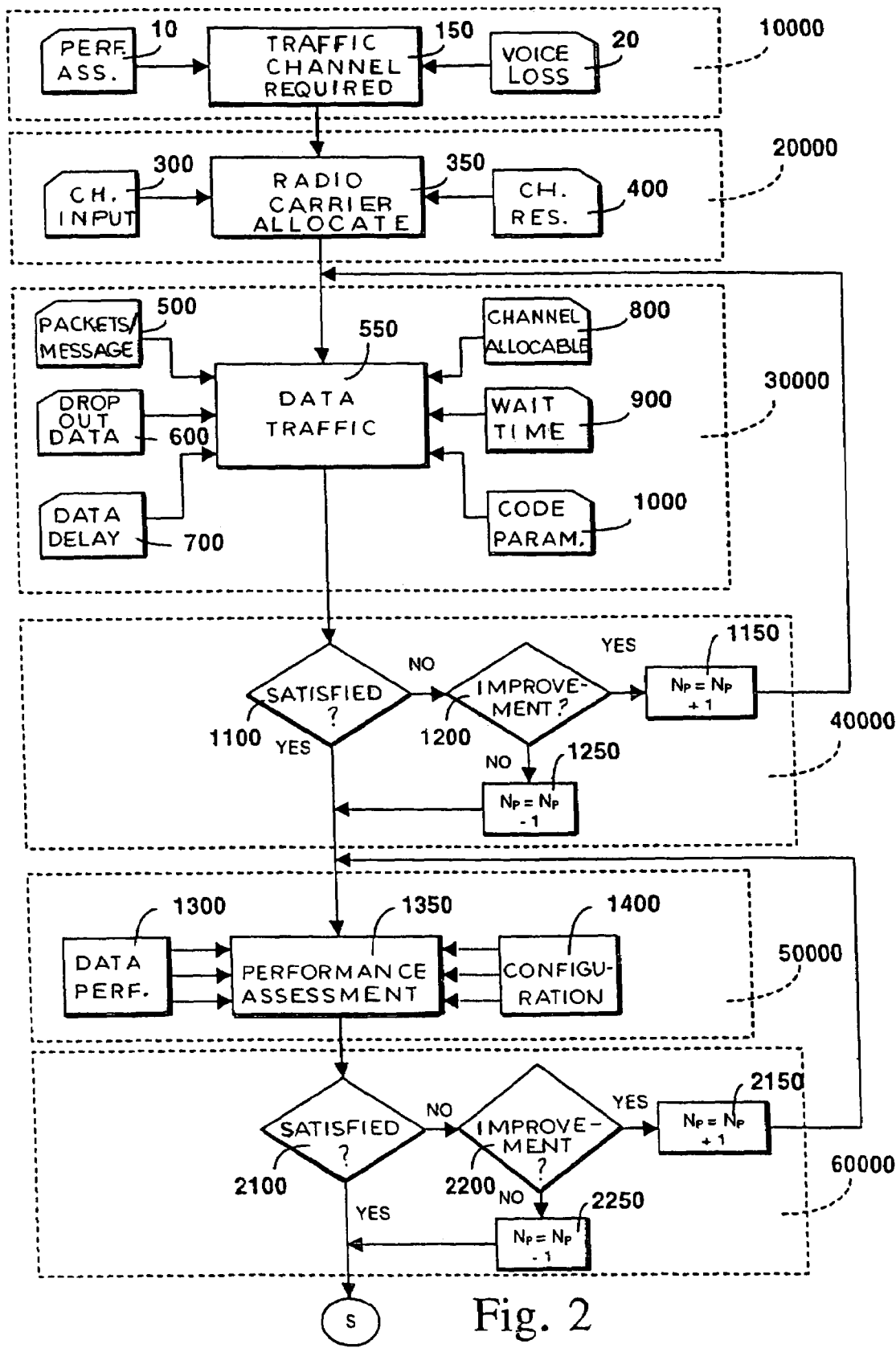
FIG. 2 is a flow diagram of the method according to the invention.

A first block 10000 (FIG. 2), of known type, suitable for assessing the number of traffic channels (slots) required (step 150) on the basis of the voice traffic to handle or Erlang 40 offered to the cell (step :L00) and under the constraint of guaranteeing a voice loss not greater than the voice loss 20 required for voice only (step 200).

A second block 20000, of known type, suitable for assessing the minimum number of radio carriers to allocate in the cell (step 250), on the basis of the number of signaling channels necessary (step 300), deducible, in a known manner, from the number of channels calculated in step 150 of the first block 10000, and on the basis of the number of channels (step 400) statically reserved for data traffic (50) only.

A third block 30000, as will be described in greater detail below, suitable for assessing the performance of the data traffic in the section between the mobile terminal and the base station (step 550), on the basis of the number of radio carriers available obtained with step 350 of the second block 20000, for data traffic characteristics offered in terms of call arrival frequency, length of the packet, average number of packets per message (step 500), data drop-out requested 30 for data traffic only (step 600), parameters relating to the delay requested for data traffic (step 700), parameters indicating the maximum numbers of channels allocable dynamically to the data service (step 800), of parameters indicating the maximum length of waiting time in the queue of a data call (step 900) and parameters relating to the codification used for data transmission for transmitting data (step 1000), for example, parameters relating to the type of GPRS encoding used.

A fourth block 40000, substantially for assessing the results obtained, suitable for confirming, increasing or reducing the number of radio carriers used by the third block 30000, comprising a first control step for controlling if the performance satisfies the requirements (step 1100).

If the outcome is positive, this step 1100 completes the block 40000 and, if the outcome is negative, it leads to a second control step for controlling if there is an improvement in the service compared with any previous situation (step 1200).

In the event of a negative outcome, this step 1200 leads to a step (step 1250) suitable for returning the number of channels to those used in block 30000 representative of a previous situation, and in the case of a positive outcome it leads to an increase in the number of channels (step 1150), if possible, knowing the maximum number of carriers allocable in a GSM cell, and to repetition of block 30000.

A fifth block 50000 for assessing the performance of the data traffic in the section between the base station and the mobile terminal (step 1350), on the basis of the number of radio carriers available (confirmed or calculated in blocks 30000 and 40000), on the basis of the set of inputs relating to the data traffic offered (step 1300) as described for steps 500, 600 and 700 of the block 30000 and on the basis of the set of configuration parameters (step 1400) as described in steps 800,900 and 1000 of block 30000.

A sixth block 60000 substantially for assessing the results obtained, suitable for confirming, increasing or reducing the number of radio carriers used by the fifth block 50000; this block 60000 is, substantially equivalent to block 540000, already described, and comprises steps 2100, 2200, 2250 and 2150 respectively equivalent to steps 1100, 1200, 1250 and 1150 already described.

Knowing the maximum number of carriers allocable in a cell of mobile apparatuses, of the GSM type for example, block 60000 leads to completion of method 10, according to the invention, recycling on block 50000 where applicable.

In the method according to the invention, the first two blocks 10000 and 20000 do not have elements of novelty with respect to the known state of the art and will only be described in broad lines, just like blocks 40000 and 60000; blocks 30000 and 50000, on the other hand, include innovative components with respect to the state of the art and will be described in detail. The functions carried out by the various blocks are implemented, in accordance with the object of this invention, in the form of programs on a computer and make it possible to determine the characteristics of a network for mobile telecommunications apparatuses.

The operation of method 10 for assessing the dimensioning and performance of a cell in a mobile telecommunications system is described taking a network of the GSM-GPRS type as reference, even though it will be obvious to technicians in the sector that the method 10 is easy to extend to mobile networks suitable for managing data traffic and/or voice and data traffic.

The first block 10000 makes it possible to assess the minimum number of traffic channels (slots) required (step 150) to handle the voice traffic offered (Erlang) to the cell (step 100), under the constraint of guaranteeing a voice loss not greater than the voice loss required for voice only (step 200).

For this purpose, step 150 of block 10000 uses the formula called "Erlang-B", known as such (model M/M/N) in first and second generation fixed and mobile telecommunications networks which, on the basis of known input data, provides the number of traffic channels to allocate in the GSM-GPRS cell to handle the traffic expressed in Erlang with the requested performance (voice drop-out).

The second block 20000 makes it possible to assess the number of radio carriers (FDMA access technique) to allocate in the cell, assuming the following as known:

the total number of traffic channel (TDMA access technique) associated with each radio carrier which, as is known, is eight channels in the case of the GSM system;

the rule of association, known as such, between the number of traffic channels calculated by the first block 10000 and the number of signaling channels needed for managing the cell (step 300);

the number of channels allocated statically to the GPRS traffic, and therefore not usable in any case by voice traffic (step 400), given that in general this is a design parameter.

In accordance with this invention, the third block 30000 makes it possible to assess the performance of data traffic (loss and user throughput) (step 550) in the section between the mobile station and base station (uplink section) on the basis of a plurality of input data, of characteristics of the GPRS data service and of assumptions regarding the method and model. In particular, as far as the input data are concerned, step 550 takes account:

of the characteristics of the data traffic offered to the cell; that is, the call arrival frequency, the length of the packet and the average number of packets per message (step 500);

of the drop-out requested for the data traffic (step 600);

of the user throughput requested for the data traffic (step 700);

of the maximum number of channels dynamically allocable to the data service (step 800), that is, usable by the GPRS data traffic is left free by the GSM voice traffic;

of the maximum waiting time in the queue of a GPRS data call (step 900);

of the GPRS encoding for transmission. of the data (step 1000);

of the number of carriers calculated by the second block 20000 in step 350.

As far as the characteristics of the GPRS data service are concerned, and in accordance with this invention, block 30000 takes account of the fact that:

each user (or, rather, GPRS mobile terminal) attempts to access the system, in accordance with various policies, for a predetermined number of seconds with multiple attempts; if the user has been unable to access the radio slot at the end of this time period, 7 seconds for example, the call is blocked;

access to the radio slot in the system is gained, in a known manner, on a call basis and not for the individual message packet; this means that once the resource has been acquired, this is maintained until the entire message itself has been transmitted;

the transmission speed of the message, after obtaining the radio resource, depends on the number of users multiplexed on the GSM frame slot; this number goes, for example, from a minimum of one user to a maximum of eight; as a consequence of this, the speed, as is known, can vary during transmission of the single message on the basis of the number of users who access the GSM-GPRS cell.

In accordance with the invention, and for the purpose of modeling the behavior of the GSM-GPRS cell for data traffic only (GPRS traffic), the method takes account of the fact that:

an M/M/N/Q model was chosen in which the system servers correspond to the cell traffic slots and the state of the cell is represented by the number of GPRS users in the system;

a queue of infinite length (Q=∞) is considered as, in the case of congestion of the traffic resources, each user makes the multiple access attempts mentioned above;

an average queue waiting time (for one GPRS user) expressed as a function of the time necessary for the mobile terminal to make the multiple access attempts mentioned above;

the entire message is deemed to be have put in the queue and not the single message packet;

an inter-arrival time between the data calls (arrivals process) characterized by exponential distribution with parameter $\lambda$ equal to the frequency of the arrivals is considered:

an average call duration (service time 1:) characterized by exponential distribution with parameter $\mu=1/\tau$ equal to the call death intensity is considered;

an average waiting time in the queue characterised by exponential distribution with parameter $\alpha$ equal to the frequency of the dropped calls (user "impatience") is considered.

While the assumption relating to the exponential distribution of parameter $\lambda$ for the data call inter-arrival times (arrival frequency) can be considered a usual and known simplification, on the other hand, the approximations regarding the exponential distribution of the parameter $\mu$ for the duration of the data calls, for the distribution, also exponential, of parameter $\alpha$, and of the waiting time in the queue, are new in this technical sector and, surprisingly, make it possible to create a method for dimensioning and assessing the performance of a GSM-GPRS cell with good reliability and, in particular, one which is easy to apply, thanks to the partial simplification of the mathematical aspects involved in the modelling, tough very complex.

On the basis of what has been listed, block 30000 makes it possible to assess the data traffic "A" offered to the cell by means of relations of a known type:

$$A = \frac{\lambda}{\mu} = \lambda \cdot \tau$$

where:

$$\tau = \frac{nL}{v_{canal}} = \frac{1}{\mu}$$

minimum service time of a data call; and $v_{canal}$ speed of the single server;

n . L length of the message (n packets of length L).

Performance of the cell on the section between the mobile terminal and the base station (probability of data block and average user throughput) are assessed using modelling of the cell state based on two different types of "state". If "i" is the number of GPRS user's in the system; we get:

the state 100000 (FIG. 3), in which the number "i" of GPRS users in the system is lower than the maximum number of data connections simultaneously supportable by the cell, where the number of slots available in a given moment for the data service is known; in this case the system exits the state "i" because of the birth of a new data call (with call arrival frequency λ) or because of the death of the call in progress; the frequency of the deaths is k·μ, where k is the number of GSM slots occupied by one or more GPRS users. In this context, each slot in which at least one data user is present contributes to the frequency of the deaths in the cell with an additive term equal to μ as:

when there is only one user, you get a transmission speed equal to the maximum speed possible; this implies an additive contribution to the overall death frequency of the cell equal to μ;

if there are two users, the transmission speed is halved (contributing to halving the death frequency associated with the slot) and doubling of the multiplexed users (which contributes to doubling the frequency of the deaths associated with the slot); on the basis of what has been described, you get an additive contribution to the overall death frequency of the cell which is still equal to $$\mu\left(\text{that is } \frac{1}{2}\cdot 2\cdot \mu\right);$$

if there are three or more users, the assessment mechanism does not change, as there is a reduction by a factor of ⅓, ¼, ⅕, ⅙, ⅐ or ⅛ in the transmission speed (with the same effect on the frequency of the deaths associated with the slot)and an increase by a factor of 3, 4, 5, 6, 7 or 8 in the number of multiplexed users (with the same effect on the frequency of the deaths associated with the slot); in all of the listed cases there is, surprisingly, an additive contribution at the overall death frequency of the cell which is still equal to μ;

the state 200000, in which the number "i" of GPRS users in the system is greater than the maximum number of connections simultaneously supportable by the cell, where the number of slots available in a given moment for the data service is known; in this case the system exits the state "i" either because of the birth of a new data call (with call arrival frequency λ) or because of the death of a call in the systems as a result of two causes:

the completion of a call in progress which occurs with death frequency given by the term equal to N·μ where N is the maximum number of slots usable by the data service;

the departure of a data call from the queue as a result of termination of the waiting time envisaged by the system which occurs with a death frequency given by the term (i−8.N)−α, where i−8·N corresponds to the number of GPRS users in the queue who each contribute with an additional term equal to α.

Knowing the number of slots available at any moment for the GPRS service, the set of possible states associated with a cell is then summed up in the flow balancing equations (of known type) required for calculating the various state probabilities, given by the relation:

$$P_x = P_0 \frac{\lambda_0 \lambda_1 \ldots \lambda_{x-1}}{\mu_1 \mu_2 \ldots \mu_x}$$

where $P_0$ is the probability of the system being in state 0; the set of probabilities is then normalised by means of the $P_0$ normalization relation (of known type), corresponding to the formula:

$$P_0 = \left(1 + \sum_{k=1}^{\infty} \prod_{i=0}^{k-1} \frac{\lambda_i}{\mu_{i+1}}\right)^{-1}$$

The power of the method 10 (FIG. 1 and FIG. 2) for assessing the performance of a base station, for example of the GSM-GPRS type, for the management of data and/or voice traffic, according to the invention, knowing the number of slots available for the data service, results from its wide use as it can be applied with variations:

in the number of traffic slots assigned statically to the data service;

in the number of traffic slots assigned dynamically to the data service;

in the number of slots requested for the connection by the mobile terminal;

in the criteria used by the GSM-GPRS network for assigning and freeing the traffic slots attributed to the data users.

What has been described so far, and underlined several times, must be intended as being associated with the number of slots available for the data service at a given moment. As this number varies in real time on the basis of the voice traffic which, in general, has priority over the GPRS calls (preemption), it is necessary to weigh up the various possible configurations of slots available for the data service with the probability, linked to voice traffic only, of each configuration effectively occurring. For this purpose, block 30000 makes it possible to assess the probabilities of having x channels left free by voice, and therefore usable by the GPRS service, through the relation:

$$\begin{cases} P^D(x) = P^V(C-x) & 1 \leq x < D \\ P^D(D) = \sum_{i=0}^{C-D} P^V(i) \end{cases}$$

where D corresponds to the maximum number of slots allocable for data (static plus dynamic) and $P_v(i)$ is the probability of having "i" slots occupied by voice, given by the relation of a known kind:

$$P^V(i) = \frac{\frac{A^i}{i!}}{\sum_{j=0}^{C-1} \frac{A^j}{j!}}$$

The effective performance of the cell (probability of data block and user throughput) is therefore given by the following relations:

$$B_D = \sum_{x=1}^{D} B(x) \cdot P^D(x) \quad \text{average probability of data block;}$$

$$R_D = \sum_{x=1}^{D} E[T](x) \cdot P^D(x) \quad \text{average data delay;}$$

with user throughput calculated in step 550 on the basis of the average delay, by means of the relation (of known type):

$$\frac{n \cdot L}{R_D}$$

with message length n·L.

Figure 3:
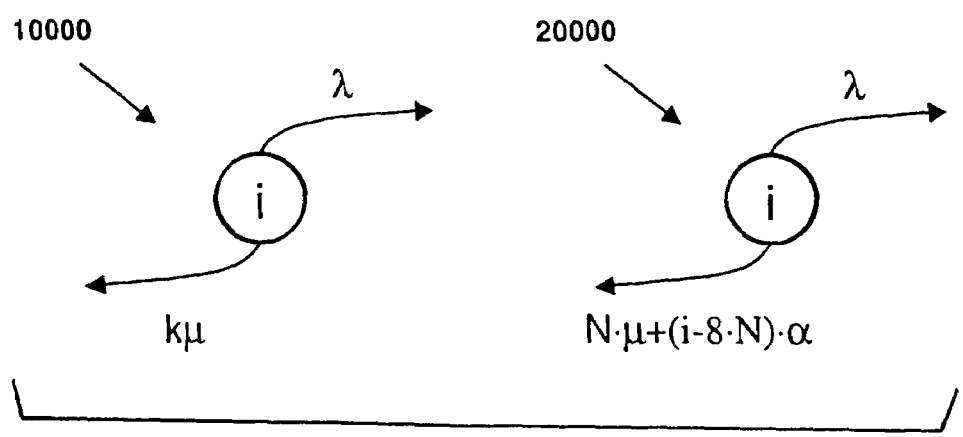
FIG. 3 is a description of a possible state of a cell of the GSM-GPRS type (in terms of the frequency of births and deaths of data calls provoking exit from the state itself) when the number of users for data traffic (GPRS users) in the system is not higher than the maximum permitted and when the number of GPRS users, present in the cell, is such as not to require a part of the calls to be put in the queue.

Block 30000 distinguishes itself with respect to the known state of the art be means of its innovative content which comprises:

taking account of the real characteristics of the data service, of the GPRS type for example, by means of the assumptions relating to transmission speed varying with time, to the average waiting time in the queue during the multiple access attempts, and to the conquest of the radio resources on a call basis and not on single packet basis;

the procedure for assessing the performance of the cell (data block and user throughput probability), knowing the number of slots available in a given moment for the data service, by means of the description of the state of the system made by the diagrams in FIG. 3;

the assessment of the effective voice loss, data loss and user throughput, in the case of coexistence of the two types of traffic (data and voice), by means of formulae which give the data block probability and the average delay on the basis of the probability of having "I" slots available for data as they have been freed from voice.

The fourth block 40000 compares the quality of the performance assessed by the third block 30000 with the expected performance (data block and requested throughput probability) and decides the increase in the number of carriers in the cell (step 1150) if the performance is not met (step 1100) and if:

the performance assessed is better compared with that obtained in the previous step (step 1200) and, of course, the maximum number of carriers allocable in a cell has not been reached.

Step 1100 makes it possible to avoid needless increase in the number of carriers if the performance, even if deemed unsatisfactory, cannot be further improved (this can occur if the number of slots allocable dynamically to the data service, the GPRS service for example, is fixed and cannot be increased even when increasing the number of carriers assigned to the cell); the limit constituted by the maximum number of carriers available takes account of the limits of the spectral bands and the rules which each mobile phone operator uses for carrying out radio dimensioning of the system base station.

The fifth block 50000, regarding the assessment of performance (data block and user throughput probability) for the section between the base station and mobile terminal (downlink section), has identical characteristics, from the point of view of the method and model assumptions, to block 30000 regarding the opposite radio section (uplink section) and therefore reference should be made to that block.

The sixth block 60000 has identical characteristics to block 40000 and in this case too the description is omitted.

Obvious modifications or variations are possible to the above description, in the dimensions, forms, materials, components, circuitry elements, connections and contacts, as in the details of the circuitry and construction illustrated, and in the method of operating without straying from the spirit of the invention as specified in the claims which follow.

The invention claimed is:

1. A method of assessing a network in terms of level of service for mobile telecommunications apparatuses suitable for managing telephone calls relating data traffic and/or voice and data traffic between said mobile apparatuses and a base station and in which the calls relating to the data traffic are such that they can be queued for a determined time, the method comprising the steps of:

attributing an average call frequency for data traffic with an exponential distribution with parameter $\lambda$;

attributing an average call duration for data traffic with an exponential distribution with parameter $\mu$;

attributing an average call waiting time in the queue for data traffic with an exponential distribution with parameter $\alpha$; and determining the characteristics of the network with regard to the data traffic in terms of level of service in the period of peak traffic, on the basis of a determined number of radio slots allocable to data traffic, and on the basis of said exponential distribution, having as parameters $\lambda$, $\mu$ and $\alpha$.

2. The method according to claim 1 wherein the parameter $\mu$ is suitable for contributing in an additive manner for determining, associated with said parameter A, the level of service in the period of peak traffic in terms of probability of a total occupation of said radio slots allocable; and said parameter a is suitable for contributing in an additive manner for determining the level of service in the period of peak traffic in terms of probability of calls dropped from the queue with regard to data traffic.

3. The method according to claim 1, wherein the step of determining the characteristics of the network also comprises the steps of comparing said characteristics so determined with predetermined performance values; and updating said determined number of radio slots allocable in such a way that said characteristics so determined correspond to said predetermined performance values.

4. The method according to claim 1 wherein the step for determining the characteristics of the network comprises determining the network characteristics with regard to the data traffic between said mobile apparatuses and said base station; and determining the network characteristics with regard to the data traffic between said base station and said mobile apparatuses.

5. The method according to claim 1 wherein said number of radio channels allocable to data traffic is determined by the steps of:
   determining the number of radio slots necessary for managing voice traffic;
   determining the probability that the radio slots for managing voice traffic occupy said slots allocable to data traffic.

* * * * *